US010094934B2

(12) United States Patent
Savoy, Jr. et al.

(10) Patent No.: US 10,094,934 B2
(45) Date of Patent: Oct. 9, 2018

(54) METHOD FOR THE GEOGRAPHICAL SELECTION OF GLOBAL NAVIGATION SATELLITE SYSTEM ELEMENTS

(71) Applicant: Honeywell International Inc., Morristown, NJ (US)

(72) Inventors: John D. Savoy, Jr., Olathe, KS (US); Vignesh Krishnan, Olathe, KS (US); Kent Woodworth, Olathe, KS (US)

(73) Assignee: Honeywell International Inc., Morris Plains, NJ (US)

( * ) Notice: Subject to any disclaimer, the term of this patent is extended or adjusted under 35 U.S.C. 154(b) by 759 days.

(21) Appl. No.: 14/475,769

(22) Filed: Sep. 3, 2014

(65) Prior Publication Data
US 2016/0061956 A1   Mar. 3, 2016

(51) Int. Cl.
*G01S 19/03*   (2010.01)
*G01S 19/45*   (2010.01)
*G01S 19/48*   (2010.01)
*G01S 19/28*   (2010.01)
*G01S 19/42*   (2010.01)
G01S 19/33    (2010.01)

(52) U.S. Cl.
CPC ............ *G01S 19/45* (2013.01); *G01S 19/03* (2013.01); *G01S 19/28* (2013.01); *G01S 19/423* (2013.01); *G01S 19/48* (2013.01); *G01S 19/33* (2013.01)

(58) Field of Classification Search
CPC .......... G01S 19/48; G01S 19/45; G01S 19/28
USPC .............. 342/357.73, 357.4, 357.31, 357.67
See application file for complete search history.

(56) References Cited

U.S. PATENT DOCUMENTS

| 5,736,960 A * | 4/1998 | Murphy | G01S 19/23 342/357.42 |
| 5,923,287 A * | 7/1999 | Lennen | G01S 19/33 342/357.73 |
| 5,951,613 A * | 9/1999 | Sahm | E02F 3/847 37/348 |

(Continued)

OTHER PUBLICATIONS

European Patent Office, "Extended European Search Report from EP Application No. 15182240.0 dated Jan. 21, 2016", "from Foreign Counterpart of U.S. Appl. No. 14/475,769", filed Jan. 21, 2016, pp. 1-9, Published in: EP.

*Primary Examiner* — Chuong P Nguyen
(74) *Attorney, Agent, or Firm* — Fogg & Powers LLC

(57) ABSTRACT

A system to select a type of satellite from a plurality of types of satellites in a multi-constellation of satellites is provided. The system includes at least a first receiver configured to input signals from a first type of satellite and a second receiver configured to input signals from a second type of satellite and a processor. The processor: executes a multi-constellation-selection software module to associate a current position with a mapping feature and select at least one selected type of satellite from the plurality of types of satellites based on the associated mapping feature; executes a compute-position/velocity/time (PVT) software module to compute a current position/velocity/time based on at least one selected input signal input at a receiver associated with the at least one selected type of satellite; and feeds the computed current position/velocity/time to the multi-constellation-selection software module based on the execution of the compute-PVT software module.

10 Claims, 12 Drawing Sheets

(56) References Cited

U.S. PATENT DOCUMENTS

| | | | | |
|---|---|---|---|---|
| 6,081,691 A * | 6/2000 | Renard | G01S 19/33 | 342/357.73 |
| 6,469,663 B1 * | 10/2002 | Whitehead | G01S 19/44 | 342/357.31 |
| 7,683,829 B2 * | 3/2010 | Lin | G01S 19/21 | 342/357.73 |
| 8,358,243 B2 * | 1/2013 | Lin | G01S 19/05 | 342/357.42 |
| 8,493,268 B2 * | 7/2013 | Warloe | G01S 19/33 | 342/357.75 |
| 8,620,306 B2 | 12/2013 | Pon et al. | | |
| 8,624,778 B2 * | 1/2014 | Syrjarinne | G01S 19/05 | 342/357.42 |
| 8,803,734 B2 * | 8/2014 | Wirola | G01S 5/0063 | 342/357.42 |
| 8,990,009 B2 * | 3/2015 | Lennen | G01S 19/34 | 340/7.32 |
| 9,448,540 B2 * | 9/2016 | Baba | G01S 19/24 | |
| 9,784,847 B1 * | 10/2017 | Barsby | G01S 19/15 | |
| 9,897,701 B2 * | 2/2018 | Sagiraju | G01S 19/21 | |
| 2004/0088111 A1 * | 5/2004 | Ahlbrecht | G01S 5/0009 | 701/471 |
| 2004/0189515 A1 * | 9/2004 | Vannucci | G01S 19/03 | 342/357.29 |
| 2006/0158372 A1 * | 7/2006 | Heine | G01S 19/07 | 342/357.31 |
| 2007/0005244 A1 | 1/2007 | Nadkarni | | |
| 2008/0194269 A1 | 8/2008 | Abernethy et al. | | |
| 2009/0234580 A1 * | 9/2009 | Fernandez-Hernandez | G01C 21/30 | 701/436 |
| 2011/0039576 A1 * | 2/2011 | Prakash | G01S 5/0236 | 455/456.1 |
| 2011/0112765 A1 | 5/2011 | Lai | | |
| 2011/0193744 A1 * | 8/2011 | Warloe | G01S 19/33 | 342/357.73 |
| 2011/0219009 A1 * | 9/2011 | Rosenfeld | G01C 21/32 | 707/743 |
| 2012/0029817 A1 * | 2/2012 | Khorashadi | G01C 21/20 | 701/451 |
| 2013/0162468 A1 | 6/2013 | Kim et al. | | |
| 2014/0085139 A1 * | 3/2014 | Leandro | G01S 19/03 | 342/357.27 |
| 2014/0368379 A1 * | 12/2014 | Lennen | G01S 19/33 | 342/357.25 |
| 2016/0178752 A1 * | 6/2016 | Davies | G01S 19/20 | 342/357.58 |

* cited by examiner

Database
110-1

First file
111

| Current Geographic location | Geopolitical region/ International region | Associated Grid point(s) | Associated SAT type |
|---|---|---|---|
| GL1 | USA | 17, 16 | GPS |
| GL2 | INR-3 | 25, 28 | GPS |
| GL3 | Europe | 760, 761, 1082, 1083 | Galileo |
| ⋮ | ⋮ | ⋮ | ⋮ |
| GL-(N-1) | China | 2893, 3025 | Beidou |
| GL-N | Russia | 7456, 7547, 9038, 9039 | GLONASS |

Second file
112-1

FIG. 3A

Database
110-2

| Current Geographic location | Geopolitical region/ International region | Associated Complex Polygons | Associated SAT type |
|---|---|---|---|
| GL1 | INR-7 | 29 | GPS |
| GL2 | INR-3 | 58 | GPS |
| GL3 | Europe | 129 | Galileo |
| ⋮ | ⋮ | ⋮ | ⋮ |
| GL-(N-1) | China | 394 | Beidou |
| GL-N | Russia | 408 | GLONASS |

First file
111

Second file
112-2

FIG. 4A

| Database 110-3 | | | | |
|---|---|---|---|---|
| | Current Geographic location | Geopolitical region/ International region | Associated Hybrid Mapping Features | Associated SAT type |
| First file 111 | GL1 | INR-7 | CP-42 | GPS |
| | GL2 | INR-3 | $CP_i$ | GPS |
| | GL3 | Europe | GP-262 | Galileo |
| | ⋮ | ⋮ | ⋮ | ⋮ |
| | GL-(N-1) | China | GP-394 | Beidou |
| | GL-N | Russia | GP-408 | GLONASS |

Second file 112-3

FIG. 5A

METHOD FOR THE GEOGRAPHICAL SELECTION OF GLOBAL NAVIGATION SATELLITE SYSTEM ELEMENTS

BACKGROUND

Global Navigation System (GNS) receivers have the ability to acquire and track satellite signals from multiple satellite constellations, such as Global Positioning System (GPS), the Russian global navigation satellite system, GLObal NAvigation Satellite System (GLONASS), etc. In addition, GNSS receivers may also have the capability to track and use Space Based Augmentation System satellites from systems like Wide Area Application Services (WAAS), European Geostationary Navigation Overlay Service (EGNOS), Multi-Function Transport Satellite (MTSAT) Satellite-based Augmentation System (MSAS), and GPS Aided Geosynchronous Earth Orbit (GEO) Augmented Navigation (GAGAN). A Global Navigation System Satellite (GNSS) receiver has the ability to track and use satellites from multiple GNSS elements, such as Satellite-Based Augmentation System (SBAS), Europe's global navigation satellite system, which is named Galileo, and GLONASS.

There are customer and regulatory hurdles to using the features of these GNSS elements in all airspaces so not all satellite constellations can be used in all airspaces. For example, a satellite constellation that is allowed for use (or specifically required for use) in a particular airspace is sometimes not allowed in another.

Currently, the pilot of a vehicle (e.g., a boat or an aircraft) traversing a number of geopolitical regions must be aware of the regulations associated with the geopolitical regions in order avoid violating regulatory requirements in those geopolitical regions. The pilot must be aware when the vehicle crosses from one geopolitical region to another geopolitical region if he is to change the GNSS and/or SBAS satellite types that can be utilized by the receiver on the vehicle. This takes time and is an additional pressure on the pilot when flying between geopolitical regions.

SUMMARY

The present application relates to a system to select one or more types of satellites from a plurality of types of satellites in a multi-constellation of satellites. The system includes a plurality of receivers including at least: a first receiver configured to input signals from a first type of satellite; and a second receiver configured to input signals from a second type of satellite. The system includes a processor configured to execute a multi-constellation-selection software module and to execute a compute-position/velocity/time (PVT) software module. The multi-constellation-selection software module is executed to associate a current position with a mapping feature and select at least one selected type of satellite from the plurality of types of satellites based on the associated mapping feature. The compute-position/velocity/time (PVT) software module is executed in order to compute a current position/velocity/time based on at least one selected input signal input at a receiver associated with the at least one selected type of satellite. The processor feeds the computed current position/velocity/time to the multi-constellation-selection software module based on the execution of the compute-PVT software module to implement rules for the at least one selected type of satellite.

DRAWINGS

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense. Embodiments of the present application can be more easily understood and further advantages and uses thereof more readily apparent, when considered in view of the description of the preferred embodiments and the following figures in which:

FIG. 3A shows an embodiment of a database that includes geographical locations associated with grid points for mapping features that span the earth in accordance with the present application;

FIG. 4A shows an embodiment of a database that includes geographical locations associated with complex polygons for mapping features in which the complex polygons span the earth in accordance with the present application;

FIG. 5A shows an embodiment of a database that includes geographical locations each associated with either at least one grid point or a complex polygon, in which the grid points and the complex polygons, in combination, span the earth in accordance with the present application;

In accordance with common practice, the various described features are not drawn to scale but are drawn to emphasize features relevant to the present application. Reference characters denote like elements throughout figures and text.

DETAILED DESCRIPTION

Figure 1:
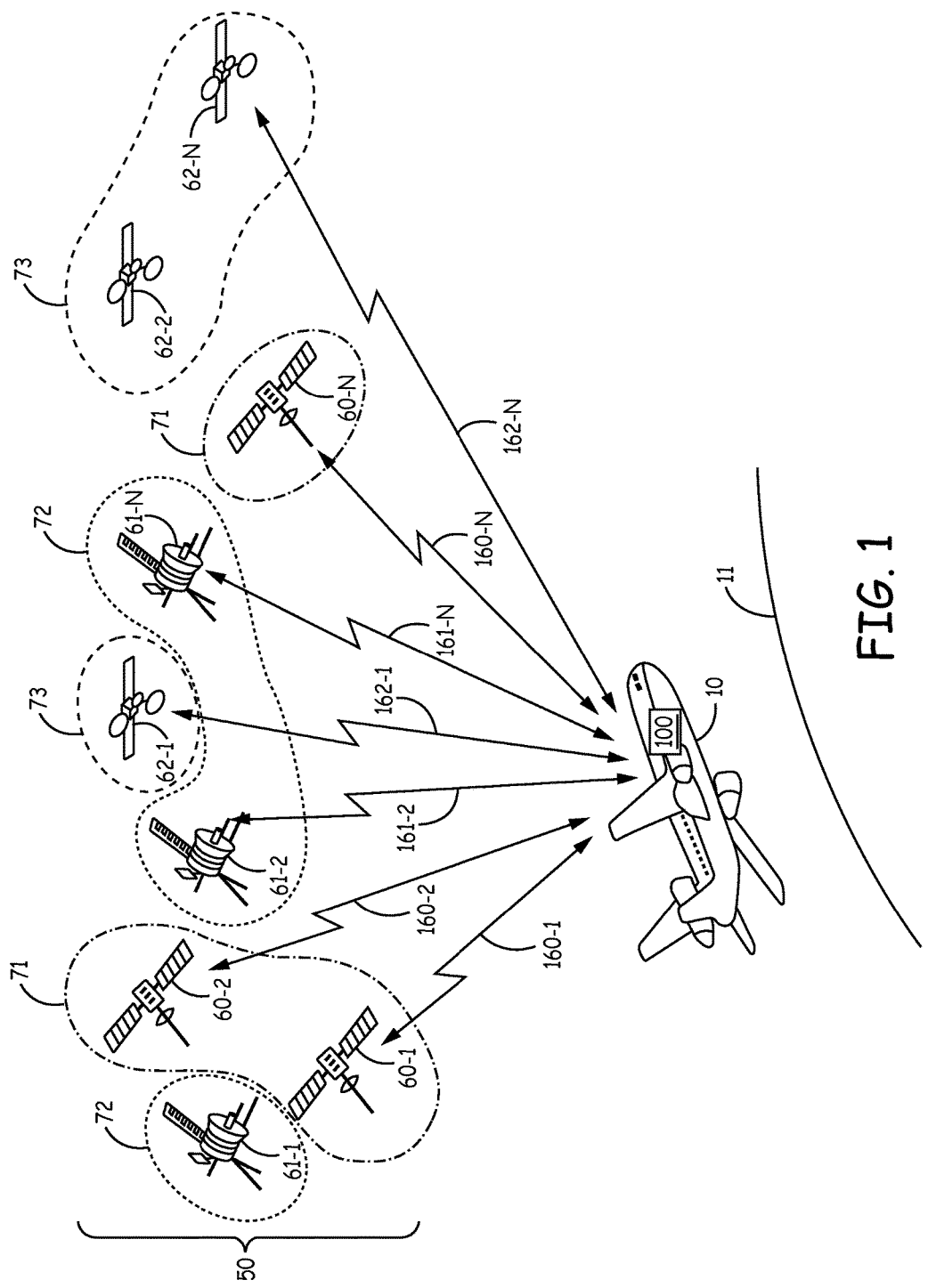
FIG. 1 shows a vehicle including an embodiment of a system to select a type of satellite from a communicatively coupled multi-constellation of satellites in accordance with the present application.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present application. The following detailed description is, therefore, not to be taken in a limiting sense.

Embodiments of the present invention provide systems and methods for vehicular navigation purposes, to select for implementation of one or more types of satellites from a plurality of types of satellites. As defined herein, a "constellation of satellites" includes a plurality of a specific type of satellite (for example, a plurality of GPS satellites, a plurality of GLONASS satellites, or a plurality of Beidou satellites). As defined herein, a "multi-constellation of satellites" is a plurality of constellations of satellites that include more than one type of satellite (for example: GPS satellites and GLONASS satellites; GPS satellites and Beidou satellites; or GPS satellites, GLONASS satellites, and Beidou satellites). The vehicle generally is only in view of a subset of the complete set of satellites in a constellation of satellites at any given time. It is also to be understood that a given vehicle may be in view of and able to communicatively couple to a single type of satellite at a given time and location. The vehicle may move into view of more than one type of satellite at a later time. Likewise, different types of satellites may move into view of the vehicle, even if the vehicle is stationary.

Types of satellites include satellites from the following types of navigation satellite systems: GLONASS, Galileo (the Satellite navigation system built by the European Union), GPS, Indian Regional Navigation Satellite System (IRNSS), Beidou (the Chinese satellite navigation system), and any other satellite system that is associated with a geopolitical unit (e.g., a country, or a grouping of allied countries). The types of satellites also include SBAS satellites, including, but not limited to, WAAS, EGNOS, MSAS, and GAGAN. The embodiments of systems and methods described herein are also applicable to any future developed global navigation satellite systems. Each constellation of satellites includes associated rules for operation. Typically, the rules for operation of a satellite system are generated by a geopolitical unit or by a plurality of geopolitical units. A geopolitical unit may be associated with one or more geopolitical region (for example, the European Union is associated with a plurality of countries on the European continent).

Oceans that are not near any geopolitical region are international territories. Thus, a vehicle that is in, on, or flying over the ocean (and outside of national boundaries) is in international territory. Based on the Antarctic Treaty System (ATS), a vehicle that is on or flying over Antarctica is also in international territory. When the systems described herein determine a vehicle is in an international territory, the selection of a type of satellite to implement from a plurality of types of satellites may be made based on one or more of: signal strength for the satellites in the various available types of satellites; a selection by a crew member at the time; a range of the currently available types of satellites; the number of available satellites in the constellation; a random selection; and/or a preselected type of satellite. Other considerations are possible. A preselected type of satellite can be stored in the database. In one implementation of this embodiment, the preselected type of satellite is based on the geopolitical affiliation of the vehicle owner. In another implementation of this embodiment, the preselected type of satellite is based on the geopolitical affiliation of the pilot.

When a vehicle is operational in or above a geopolitical region, the selection of the one or more types of satellite is made based on a current position of a vehicle, and an implementation of a database that uses mapping features to correlate the current position with a geopolitical region. The rules that apply to the GNS satellites in the geopolitical region are implemented based on the selection. The described geopolitical regions are detailed, bounded in size, and efficient to use. The mapping features are grid points and/or complex polygons that span the earth.

The database is part of a multi-constellation-selection (MCS) software module (function). The database is also referred to herein as an "MCS database". The MCS-database is accessed by a processor for implementing the MCS function. In one implementation of this embodiment, the processor contains software that: 1) determines the current position; 2) finds (e.g., with hysteresis) the nearest grid point (i.e., a latitude/longitude pair) in a grid; 3) determines the region associated with that grid point; 4) determines the rules for GNSS/SBAS usage that apply in that region; and 5) properly selects the one or more types of satellites according to the rules for that region.

In another implementation of this embodiment, the processor contains software that: 1) determines the current position; 2) finds which complex polygon is associated with the current position; 3) determines the region associated with that complex polygon; 4) determines the rules for GNSS/SBAS usage that apply in that region; and 5) properly selects the one or more types of satellites according to the rules for that region.

In yet another implementation of this embodiment, the processor contains software that 1) determines the current position; 2) finds which complex polygon or grid point in a grid is associated with the current position; 3) determines the region associated with that complex polygon or grid point; 4) determines the rules for GNSS/SBAS usage that apply in that region; and 5) properly selects the one or more types of satellites according to the rules for that region.

FIG. 1 shows a vehicle 10 including an embodiment of a system 100 to select a type of satellite 71, 72, or 73 from a communicatively coupled multi-constellation 50 of satellites 60(1-N), 61(1-N), and 62(1-N) in accordance with the present application. The system 100 is positioned on the vehicle 10. The satellites 60(1-N) are a subset of the satellites in a constellation of satellites 60 comprising satellites of a first type (e.g., a first type of satellite 71). The satellites 60(1-N) are communicatively coupled to the vehicle 10 by a respective communication link 160(1-N).

Satellites 61(1-N) are a subset of the satellites in a constellation of satellites 61 comprising satellites of a second type (e.g., a second type of satellite 72). Satellites 61(1-N) are communicatively coupled to the vehicle 10 by a respective communication links represented generally at 161-1 and 161-N.

Satellites 62(1-N) are a subset of the satellites in a constellation of satellites 62 comprising satellites of an $n^{th}$ type (e.g., an $n^{th}$ type of satellite 73), where n is positive integer. Satellites 62(1-N) are communicatively coupled to the vehicle 10 by a respective communication link represented generally at 162-1 and 162-N. The communication links 160-$i$, 161-$j$, and 162-$k$ are wireless communication links, where i, j, and k indicate an $i^{th}$, a $j^{th}$, and a $k^{th}$ communication link.

As shown in FIG. 1, the vehicle 10 is an aircraft 10 flying over the earth 11. In one implementation of this embodiment, the vehicle 10 is a water-based vehicle 10 or a land-based vehicle 10.

Figure 2A:
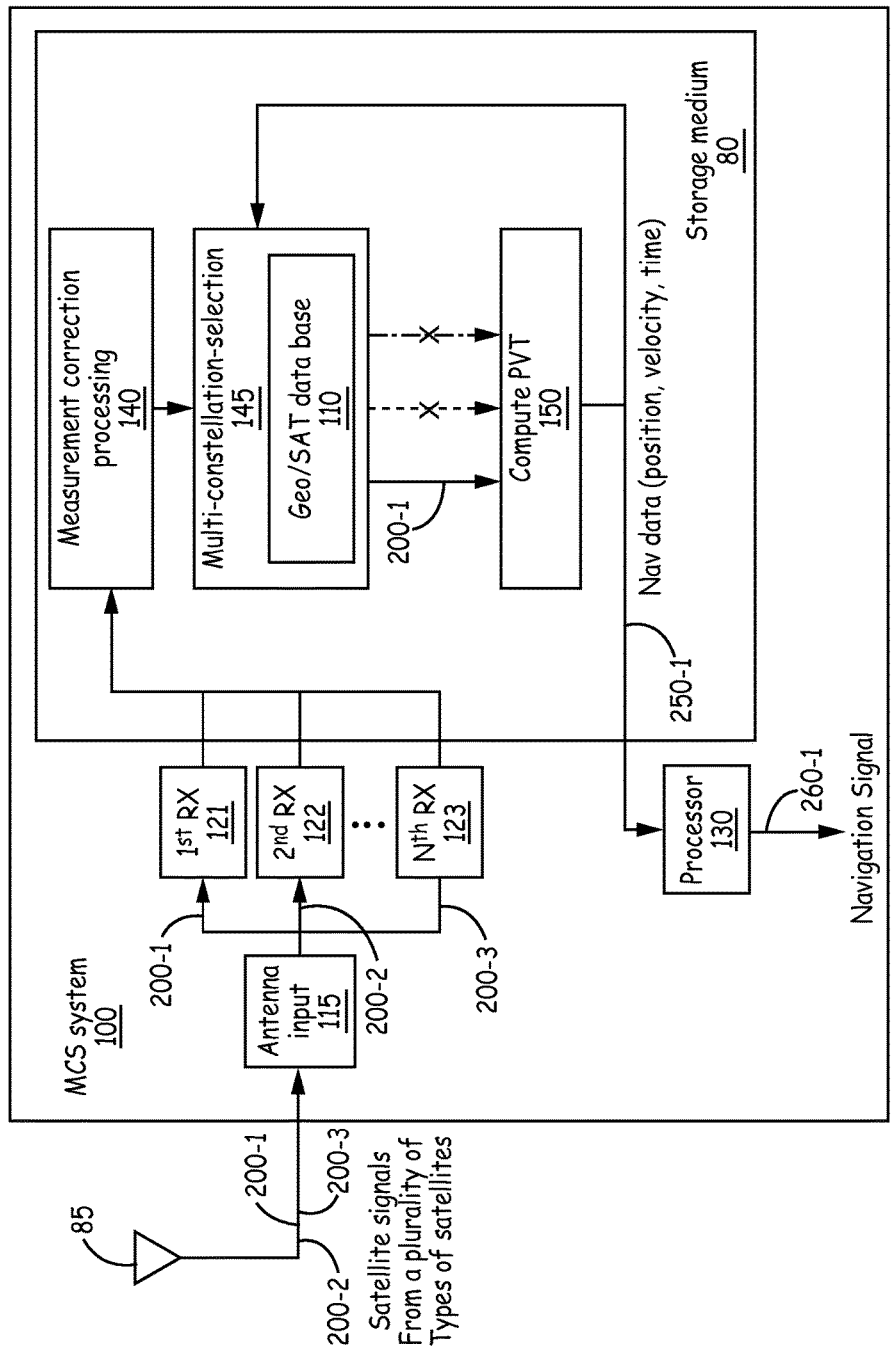
FIG. 2A shows an embodiment of a system configured to select a first type of satellite from a plurality of types of satellites in a multi-constellation of satellites in accordance with the present application.
Figure 2B:
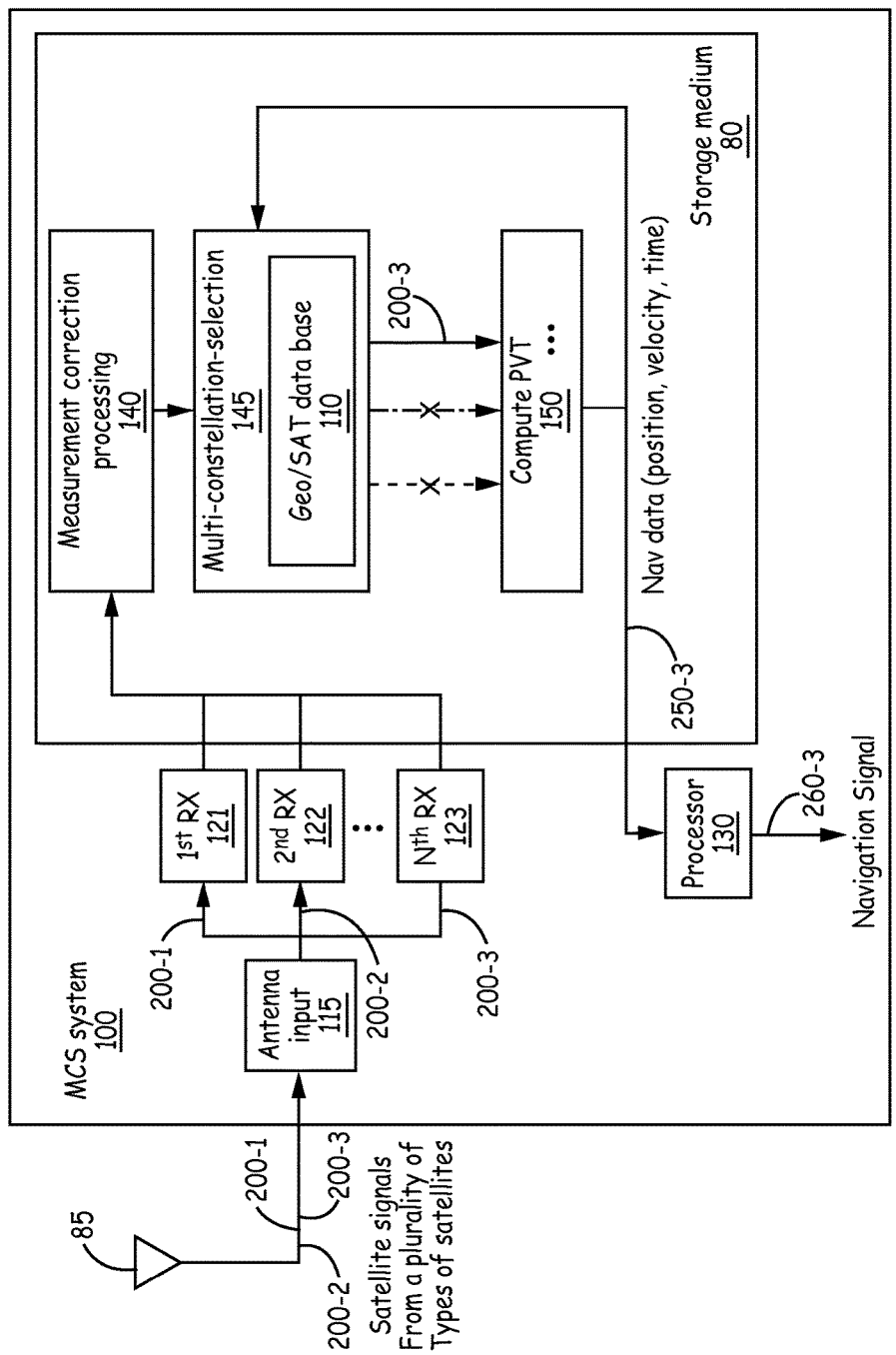
FIG. 2B shows the system of FIG. 2A configured to select an $n^{th}$ type of satellite from the plurality of types of satellites in the multi-constellation of satellites.
Figure 2C:
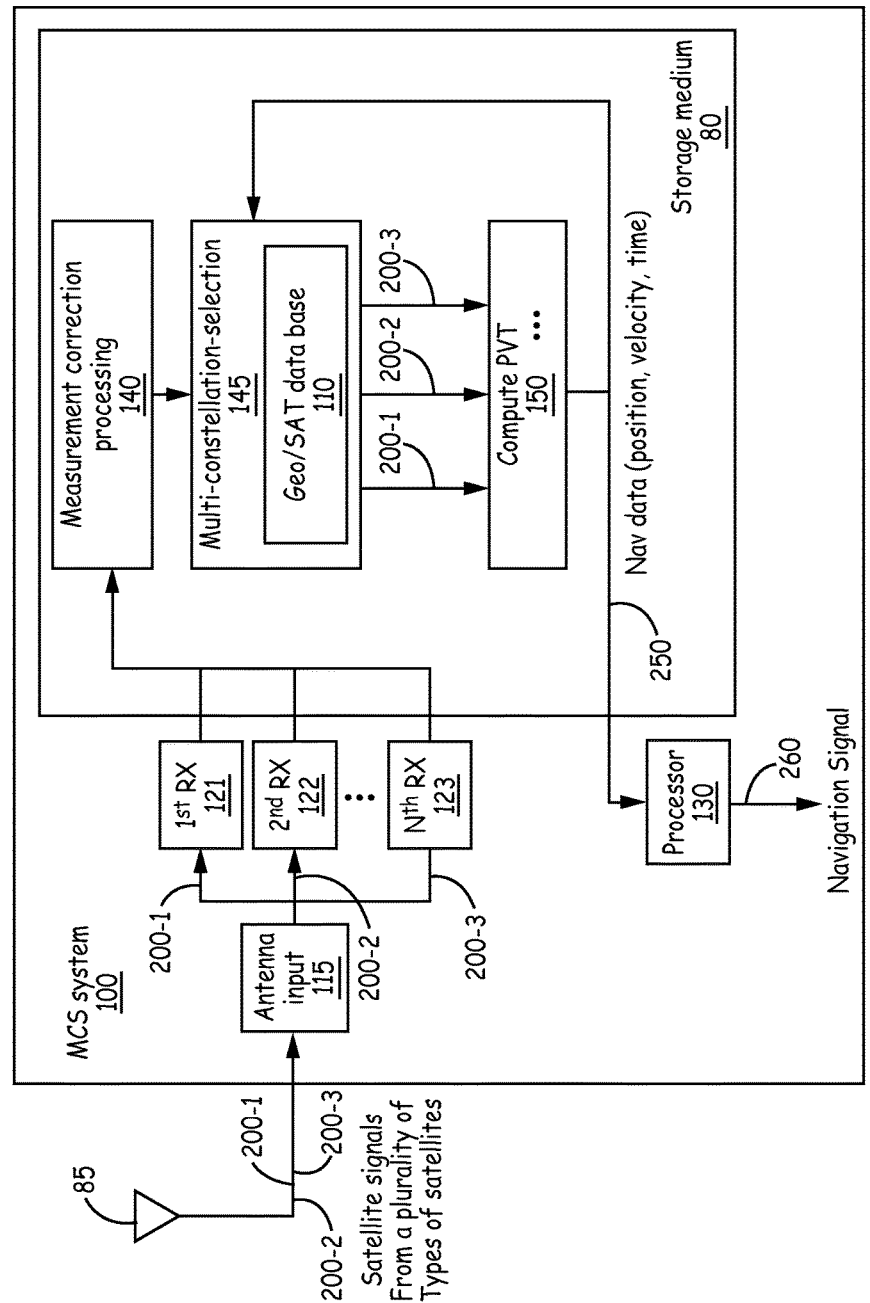
FIG. 2C shows the system of FIG. 2A configured to select more than one type of satellite from the plurality of types of satellites in the multi-constellation of satellites.

The system 100 on the vehicle 10 is now described with reference to FIGS. 2A-2C. FIG. 2A shows an embodiment of a system 100 configured to select a first type of satellite 60 from a plurality of types of satellites 71-73 in a multi-constellation of satellites 50 (FIG. 1) in accordance with the present application. FIG. 2B shows the system 100 of FIG. 2A configured to select an $n^{th}$ type of satellite 62 from the plurality of types of satellites 71-73 in the multi-constellation 50 of satellites 60(1-N), 61(1-N), and 62(1-N). FIG. 2C shows the system 100 of FIG. 2A configured to select more than one type of satellite 60, 61, and 62 from the plurality of types of satellites 60, 61, and 62 in the multi-constellation 50 of satellites 60(1-N), 61(1-N), and 62(1-N).

The system 100 is also referred to herein as a "multi-constellation-selection (MCS) system 100" or "a navigation system 100".

The MCS system 100 includes an antenna input 115, a plurality of receivers 121-123, and a processor 130 configured to execute software stored in a storage medium 80. As defined herein, a receiver is an element that is capable of receiving signals from a specific type of satellite. As is understandable to one skilled in the art, the plurality of receivers 121-123 can be combined in a single device that is capable of receiving signals from a respective plurality of types of satellite. Thus, the plurality of receivers 121-123 can be a single receiver device and the antenna input 115 is built into this single receiver device. Also, a single receiver can track satellites from multiple SBAS systems in which case the selections (200-1, 200-2, 200-3 would not really correspond to the measurements by different receivers). Measurements by a single receiver may not all be used by the software in this case and would depend on the SBAS selection rules for the current geopolitical region.

The software includes a measurement correction processing software module 140, multi-constellation-selection software module 145, and a compute-position/velocity/time (PVT) software module 150. The multi-constellation-selection software module 145 includes at least one database (Geo/SAT database) 110. The database 110 correlates the plurality of type of satellites to geopolitical regions and international regions on the earth 11.

At least one antenna 85 (shown as a single antenna 85 in FIGS. 2A-2C) on the vehicle 10 is communicatively coupled to the antenna input 115 in the MCS system 100. The signals from the first type of satellite 71 that are output from the antenna 85 to the antenna input 115 are represented generally at 200-1. The signals from the second type of satellite 72 that are output from the antenna 85 to the antenna input 115 are represented generally at 200-2. The signals from the $n^{th}$ type of satellite 73 that are output from the antenna 85 to the antenna input 115 are represented generally at 200-3.

The MCS system 100 selects a type of satellite 71, 72, or 73 from the plurality of types of satellites 71, 72, and 73 in a multi-constellation of satellites 50 that are currently in view of the antenna 85. The compute-PVT software module 150 is configured to process the satellite signals 200(1-3) received from one or more of the plurality of types of satellites 71-73 in accordance with the rules related to the respective satellite constellations 60-62.

As the vehicle 10 moves above or on the earth 11, the processor 130 may change which type of satellite signals are processed by the compute-PVT software module 150 as the vehicle 10 moves from one geopolitical region to another geopolitical region. Likewise, as the vehicle 10 is stationary on the earth 11, the processor 130 may change which type of satellite signals are processed by the compute-PVT software module 150 if the satellites that are of the currently selected type of satellite move out of range (out of the view) of the vehicle 10. In this manner, MCS system 100 automatically implements the rules for a geopolitical region, without using any input from the pilot of the vehicle 10. The MCS system 100 automatically implements the rules for a second geopolitical region when the vehicle 10 moves from a first geopolitical region to the second geopolitical region. Likewise, the MCS system 100 automatically implements the rules for a geopolitical region when the vehicle 10 moves from an international region to a geopolitical region.

Each of the plurality of receivers 121, 122, and 123 is configured to input a type of satellite signal 200-1, 200-2, and 200-3, respectively, from a particular type of satellite (e.g., type of satellite 71, 72, and 73, respectively). As is known to one skilled in the art, a filter and/or switching fabric between the antenna input 110 and the receivers 121, 122, and 123 directs each of the signals 200-1, 200-2, and 200-3 to the respective receivers 121, 122, and 123.

A first receiver 121 is configured to input signals 200-1 from the first type of satellite 71. In the embodiment shown in FIG. 1, the first receiver 121 inputs signals 200-1 from satellites 60(1-N). A second receiver 122 is configured to input signals 200-2 from the second type of satellite 72. In the embodiment shown in FIG. 1, the second receiver 122 inputs signals 200-2 from satellites 61(1-N). An $n^{th}$ receiver 123 is configured to input signals 200-2 from the $n^{th}$ type of satellite 73. In the embodiment shown in FIG. 1, the $n^{th}$ receiver 123 inputs signals 200-3 from satellites 62(1-N).

The processor 130 executes the measurement correction processing software module 140 and directs output from the measurement correction processing software module 140 to the multi-constellation-selection software module 110.

The processor 130, as shown in the embodiment of FIG. 2A, executes the multi-constellation-selection software module 145 to: 1) associate a current position with a mapping feature in the database 110; 2) select at least one selected type of satellite from the plurality of types of satellites based on the associated mapping feature; 3) execute the compute-position/velocity/time (PVT) software module 150 in order to compute a current position/velocity/time based on at least one selected input signal input at a receiver associated with the at least one selected type of satellite; and 4) feed the computed current position/velocity/time to the multi-constellation-selection software module 145 based on the execution of the compute-PVT software module 150. By executing the compute-PVT software module 150, the rules for the at least one selected type of satellite are implemented. In one implementation of this embodiment, only one type of satellite is selected. In another implementation of this embodiment, two type of satellites are selected. In embodiments of this latter case, one of the at least one selected type of satellite includes a SBAS, although it is not required to select an SBAS type of satellite. The term "selected type of satellite" as used herein is indicative of "at least one selected type of satellite".

As shown in FIG. 2A, the first type of satellite 71 is the selected type of satellite. In this case, the input signals 200-1 input at the first receiver 121 from the first type of satellite 71 are selected by the multi-constellation-selection software module 145. Therefore, signals 200-1 pass through the multi-constellation-selection software module 145 to the compute-PVT software module 150 as indicated by the solid line labeled 200-1. There are no signals 200-2 or 200-3 being passed to the compute-PVT software module 150 since the second type of satellite and the $n^{th}$ type of satellite were not selected. This is indicated by the dashed lines with an X connecting the multi-constellation-selection software module 145 and the compute-PVT software module 150. The X indicates that the signals 200-2 and 200-3 are deselected. In one implementation of this embodiment, the multi-constellation-selection software module 145 (or the processor 130) outputs shut-down signals for the signals 200-2 and 200-3 to the compute-PVT software module 150 before or when sending the signals 200-1 to the compute-PVT software module 150. This is also referred to as implementing the rules for the selected type of satellite 71.

The compute-PVT software module 150 is configured to process signals 200-1 according to the rules of the first type of satellite 71. In this manner, rules for the selected type of satellite 71 are implemented by the MCS system 100. In one implementation of this embodiment, the one or more types of satellites are selected from a plurality of types of satellites in a currently available Global Navigation System Satellite (GNSS). In another implementation of this embodiment, the first type of satellite 71 is selected from the group consisting of: GLONASS; Galileo; GPS; IRNSS; and Beidou.

The navigation data, including information indicative of the current position, velocity and time of the vehicle 10, is output as signals 250-1 from the compute-PVT software module 150. The processor 130 outputs a navigation signal 260-1 based on the navigation data 250-1. It is to be understood that additional processing to obtain the navigation solution is handled by the processor 130 or other processors 130 in the vehicle 10. The operation of the MCS system 100, in which another type of satellite is different from the type of satellite (or types of satellite) selected in FIG. 2A, is now described with reference to FIG. 2B.

As shown in FIG. 2B, the other type of satellite being selected is the $n^{th}$ type of satellite 73. In this case, the signals 200-3 from the $n^{th}$ type of satellite 73 are selected by to multi-constellation-selection software module 145. The $n^{th}$ type of satellite 73 is different from the first type of satellite 71. Therefore, signals 200-3 pass through the multi-constellation-selection software module 145 to the compute-PVT software module 150 as indicated by the solid line labeled 200-3. There are no signals 200-1 or 200-2 being passed to the compute-PVT software module 150 since the first type of satellite 71 and the second type of satellite 72 were not selected. This is indicated by the dashed lines with an X connecting the multi-constellation-selection software module 145 and the compute-PVT software module 150. The X indicates that the signals 200-1 and 200-2 are deselected. In one implementation of this embodiment, the multi-constellation-selection software module 145 (or the processor 130) outputs shut-down signals for the signals 200-1 and 200-2 to the compute-PVT software module 150 before or when sending the signals 200-3 to the compute-PVT software module 150. This is also referred to as implementing the rules for the selected type of satellite 73.

As shown in FIG. 2C, each of three types of satellite are selected. In this case, the signals 200-1, 200-2, and 200-3 from the first, second, and $n^{th}$ type of satellite 71, 72, and 73 are selected by to multi-constellation-selection software module 145. This scenario is possible when the type of satellite is an SBAS. In this case, signals 200-1, 200-2, and 200-3 pass through the multi-constellation-selection software module 145 to the compute-PVT software module 150 as indicated by the solid lines labeled 200-1, 200-2, and 200-3. There are no deselected signals.

The compute-PVT software module 150 is configured to process signals 200-1, 200-2, and 200-3 according to the rules of the first, second, and $n^{th}$ type of satellite 21, 72, and 73. In this manner, rules for the selected type of satellite are implemented by the MCS system 100. This is also referred to as implementing the rules for the selected types of satellite 71, 72, and 73.

The navigation data, including information indicative of the current position, velocity and time of the vehicle 10, is output as signals 250 from the compute-PVT software module 150. The processor 130 outputs a navigation signal 260 based on the navigation data 250.

The database 110 includes: the multi constellation selection database part number; a list of currently active Global Navigation Satellite System constellations; a list of currently active Satellite-Based Augmentation System providers; a list of geopolitical regions; the allowed Global Navigation System Satellite constellations for the geopolitical regions; Satellite-Based Augmentation System providers for the geopolitical regions; and the rules related to the various geopolitical regions. The database 110 is also referred to herein as an MCS database 110. In one implementation of this embodiment, the database 110 also includes lists of individual satellite identifiers. In one implementation of this embodiment, the database 110 includes only a single file. In another implementation of this embodiment, the database 110 is a plurality of databases and/or a plurality of files.

FIGS. 3A, 4A, and 5A show exemplary data bases 110 (1-3), respectively. Each of the data bases 110(1-3) include a first file 111. The first file 111 contains information including the MCS database part number, a list of currently active GNSS constellations, a list of currently active SBAS providers, a list of geopolitical regions which includes the allowed GNSS constellations and SBAS providers for each geopolitical region. The term "SBAS provider" refers to an augmentation system to GNSS and each SBAS system targets a region (WAAS is over the contiguous United States of America, EGNOS is over Europe, GAGAN is over India, and MSAS is over Japan). For example, the FAA is the service provider for Wide Area Augmentation System (WAAS), which is an SBAS. The United States Air Force is the service provider for GPS. The European Aviation Safety Agency (EASA) is the service provider for the European Geostationary Navigation Overlay (satellite-based augmentation) (EGNOS), which is an SBAS.

In one implementation of this embodiment, the part number is contained in the XML element tags <part_number></part_number>. In another implementation of this embodiment, the MCS database 110 contains one pair of XML element tags <Constellation></Constellation> for each available GNSS satellite constellation. In yet another implementation of this embodiment, the "GNSS Constellation Mask" parameter is a 16-bit hexadecimal value with a unique bit assigned to each constellation. When it occurs within a <Constellation></Constellation> pair, this parameter has a '1' in the bit position assigned to the corresponding constellation, and all other bits set to '0'. The entire set of information on the GNSS constellations are encapsulated within a pair of <GNSS_elements></GNSS_elements> tags. The parameters and element tags for a constellation are listed in Table 1 below.

TABLE 1

| Parameter | Element tags |
| --- | --- |
| Constellation name | <name></name> |
| GNSS Constellation Mask | <mask></mask> |

The MCS database 110 includes a pair of XML element tags <provider></provider> for each available SBAS provider (as defined in RTCA/DO-229D). The parameters and element tags for satellites are listed in Table 2 below.

TABLE 2

| Parameter | Element tags |
| --- | --- |
| Provider name | <name></name> |
| SBAS Provider Mask | <mask></mask> |

The "SBAS Provider Mask" parameter is a 16-bit hexadecimal value with a unique bit assigned to each SBAS Provider. When it occurs within a <provider></provider> pair, this parameter has a '1' in the bit position assigned to the corresponding provider, and all other bits set to '0'. The entire set of information on the SBAS providers is encapsulated within a pair of <SBAS_elements></SBAS_elements> tags.

The MCS database 110 contains a list of all geopolitical regions. Each geopolitical region is encapsulated within a pair of <region></region> element tags. The parameters and element tags for geopolitical region are listed in Table 3 below.

TABLE 3

| Parameter | Element tags |
| --- | --- |
| Region name | <name></name> |
| Unique 8-bit identifier | <ID></ID> |
| GNSS Constellation Mask | <GNSS_constellations_allowed></GNSS_constellations_allowed> |
| SBAS Provider Mask | <SBAS_providers_allowed></SBAS_providers_allowed> |

When occurring within a <region></region> pair, the GNSS Constellation Mask has a '1' in the bit position for each GNSS constellation that is allowed to be used in the corresponding region. Similarly, the SBAS Provider Mask has a '1' in the bit position for each SBAS provider that is allowed to be used in the region. In one implementation of this embodiment, the complete list of elements containing the geopolitical regions is encapsulated within a pair of <region_information></region_information> tags. In another implementation of this embodiment, the areas covered by the geopolitical regions are described using a list of grid points (latitude/longitude pairs) obtained by dividing at least a portion of the earth into a set of grid points as described below with reference to FIGS. 3B and 5B.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor receives instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs)."

Figure 3B:
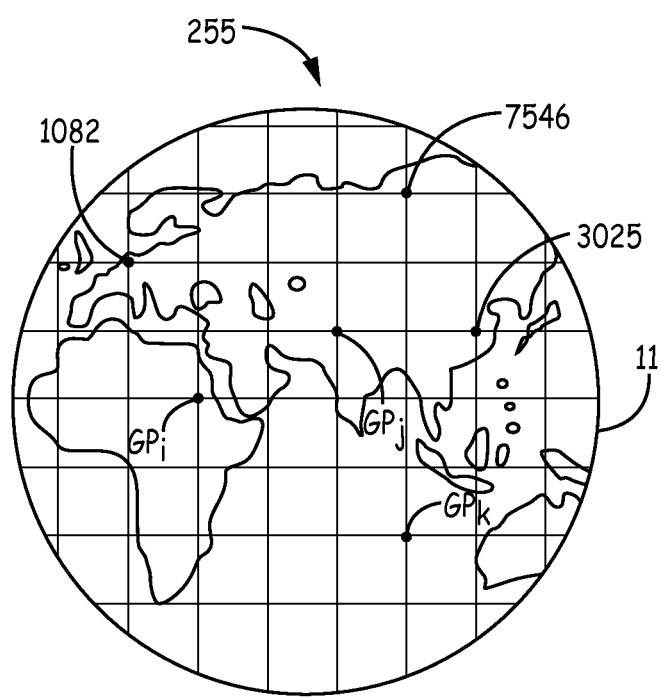
FIG. 3B shows exemplary grid points, associated with the database of FIG. 3A, in a grid spanning the earth.

Embodiments of exemplary databases 110-1, 110-2, and 110-3 are now described with reference to FIGS. 3A, 4A, and 5A, respectively. FIG. 3A shows an embodiment of a database 110-1 that includes grid points for mapping features in which the grid points span the earth 11 in accordance with the present application. The database 110-1 is also referred to herein as "MCS database 110-1". FIG. 3B shows exemplary grid points represented generally at GP-i, GP-j, and GP-k, associated with the database 110-1 of FIG. 3A, in a grid 255 spanning the earth 11. The exemplary database 110-1 of FIG. 3A includes a first file 111 and a second file 112-1. The features of the first file 111 were described above.

Each grid point GP is associated with a latitude and a longitude of the earth. The latitude and longitude for a given grid point is referred to herein as a latitude/longitude pair $lat_i/long_j$. Long indicates a $j^{th}$ longitude. $Lat_i$ indicates an $i^{th}$ latitude. Since every point on earth is uniquely identified by a latitude/longitude pair, each grid point in the second file 112-3 of the database 110-3 is associated with a geopolitical region or an international region.

As shown in FIG. 3A, the second file 112-1 of the database 110-1 includes data that associates at least one grid point with a geographical location. The geographical locations in database 110-1 are represented as GL1, GL2, etc. in the first column of the second file 112-1 in database 110-1 of FIG. 3A. It is to be understood that not every latitude/longitude pair is listed as a geographical location GL in the database 110-1. The processor 130 is configured to extrapolate from a given location (latitude/longitude pair) indicated by the navigation system to one of the geographical locations in database 110-1 as is understandable to one skilled in the art. The geopolitical regions or international regions are shown in the second column of the second file 112-1 of the database 110-1 of FIG. 3A. The grid points (mapping features) are shown in the third column of the second file 112-1 of the database 110-1 of FIG. 3A. The satellite types are shown in the fourth column of the second file 112-1 in database 110-1 of FIG. 3A. The geographical locations, the geopolitical region or international region, the grid points, and the satellite type on a given row of the second file 112-1 are associated with each other as is understandable to one skilled in the art. In this manner, each grid point in the second file 112-1 of the database 110-1 is associated with a geopolitical region or an international region and at least one associated type of satellite.

Each GLj, where GLj is a $j^{th}$ geographic location, is associated with one or more grid points in the grid 255. If the latitude/longitude pair $lat_i/long_j$ for the geographic location $GL_k$ is directly on a grid point, that grid point is associated with the geographic location $GL_k$ that is used to select a satellite type. However, if the latitude/longitude pair $lat_i/long_j$ for the geographic location $GL_k$ is at the center of four grid points, then all four grid points are associated with the geographic location $GL_k$. In this case, any one of the four grid points can be used for the geographic location that is used to select a satellite type.

The second file 112-1 is a binary file that contains a list of 8-bit values specifying the geopolitical region or international region at each grid point.

In FIG. 3B, the exemplary grid point GP-1082 is located in north-western Europe, GP-7546 is located in Russia, and GP-3025 is located in China. In the exemplary database 110-1, the satellite type GPS is associated with the third international region (INR-3), the satellite type Galileo is associated with GP-1082, the satellite type GLONASS is associated with GP-7546, and the satellite type Beidou is associated with GP-3025.

In one implementation of this embodiment, the first file 111 is in Extensible Mark-up Language (XML) format. In another implementation of this embodiment, both the first file 111 and the second file 112-1 of the MCS database 110-1 are XML files.

Figure 4B:
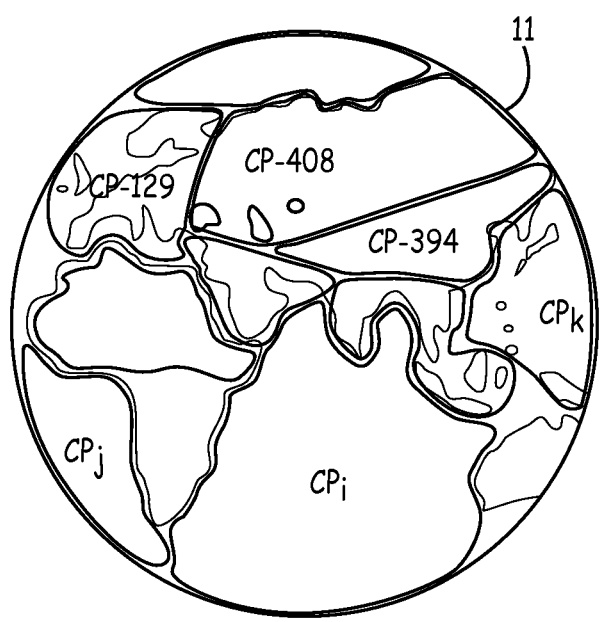
FIG. 4B shows exemplary complex polygons, associated with the database of FIG. 4A, spanning the earth.

FIG. 4A shows an embodiment of a database 110-2 that includes complex polygons for mapping features in which the complex polygons span the earth 11 in accordance with the present application. The database 110-2 is also referred to herein as a "MCS database 110-2". FIG. 4B shows exemplary complex polygons represented generally at CP-I, associated with the database 110-2 of FIG. 4, spanning the earth A. The exemplary database 110-2 of FIG. 4A includes the first file 111 and a second file 112-2. The first file 111 in MCS database 110-2 is as described above.

The second file 112-2 of the database 110-2 includes data that associates a complex polygon with a geographical location. The geographical locations in database 110-2 are represented as GL1, GL2, etc. in the first column of the second file 112-2 in database 110-2 of FIG. 4A. The geopolitical regions or international regions are shown in the second column of the second file 112-2 in the database 110-2 of FIG. 4A. The mapping features are shown in the third column of the second file 112-2 in the database 110-2 of FIG. 4A. The satellite types are shown in the fourth column of the second file 112-2 in database 110-2 of FIG. 4A. The geographical locations, the geopolitical region or an international region, the complex polygons, and the satellite type on a given row of the second file 112-2 are associated with each other as is understandable to one skilled in the art. In this manner, each complex polygon in the second file 112-2 of the database 110-2 is associated with a geopolitical region or an international region and at least one associated type of satellite.

The second file 112-2 is a binary file that contains a list of 8-bit values specifying the geopolitical region or international region at each complex polygon.

FIG. 4B shows exemplary complex polygons CP$_i$, CP$_j$, and CP$_k$, associated with the database 110-2 of FIG. 4A, arranged in a non-overlapping pattern that segments and covers the earth 11, where i, j, and k are positive integers and CP$_i$ is an i$^{th}$ complex polygon. The complex polygons CP$_i$, which are shown superimposed over the earth 11 in FIG. 4B, are associated with the complex polygons listed in the third column of the second file 112-1 in database 110-2 of FIG. 4A. The complex polygon CP-129 is shown in FIG. 4B to overlap with Europe. The complex polygon CP-408 is shown in FIG. 4B to overlap with Russia. The satellite types associated with the complex polygons in the third column of database 110-2 are shown in the fourth column of the second file 112-2 in database 110-2 of FIG. 4A. Thus, the complex polygon CP-129 that overlaps with Europe is associated with the satellite type Galileo, while the complex polygon CP-408 that overlaps with Russia is associated with the satellite type GLONASS.

Figure 5B:
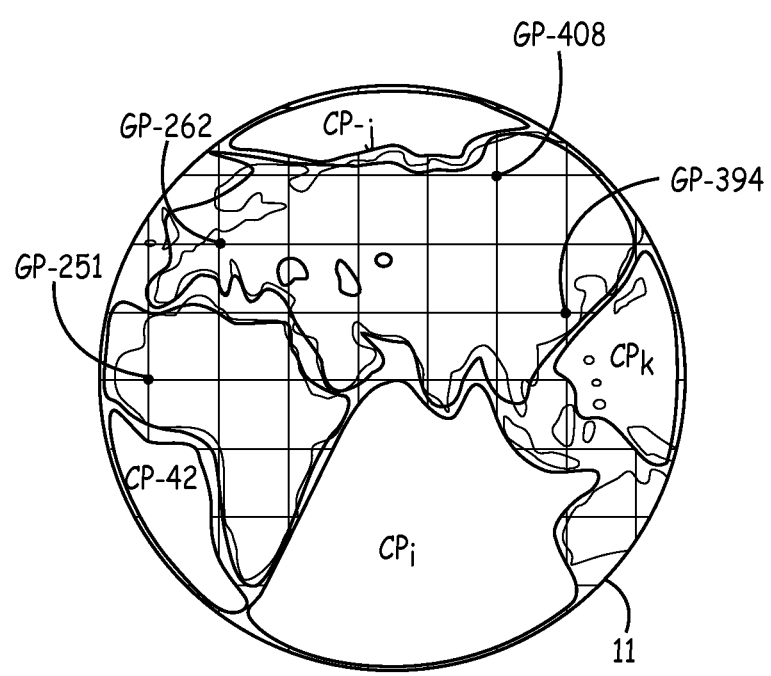
FIG. 5B shows exemplary grid points and complex polygons, associated with the database of FIG. 5A, spanning the earth.

FIG. 5A shows an embodiment of a database 110-3 that includes geographical locations each associated with either at least one grid point or a complex polygon, in which the grid points and the complex polygons, in combination, span the earth 11 in accordance with the present application. Since the mapping features include a combination of complex polygons and grid points, these mapping features are referred to as "hybrid mapping features". The database 110-3 is also referred to herein as an "MCS database 110-3". FIG. 5B shows exemplary grid points and complex polygons, associated with the database of FIG. 5A, spanning the earth. The exemplary database 110-3 of FIG. 5A includes a first file 111 and a second file 112-3. The first file 111 in MCS database 110-3 is as described above.

The second file 112-3 of the database 110-3 includes data that either associates at least one grid point with a geographical location or associates a complex polygon with a geographical location. The geographical locations in database 110-3 are represented as GL1, GL2, etc. in the first column of the second file 112-3 in database 110-3 of FIG. 5A. The geopolitical regions or international regions are shown in the second column of the second file 112-3 in the database 110-3 of FIG. 5A. The hybrid mapping features are shown in the third column of the second file 112-3 in the database 110-3 of FIG. 5A. The satellite types are shown in the fourth column of the second file 112-3 in database 110-3 of FIG. 5A. The geographical locations, the geopolitical region or an international region, the grid points or complex polygons (hybrid mapping features), and the satellite type on a given row of the second file 112-3 are associated with each other as is understandable to one skilled in the art. In this manner, each complex polygon and each grid point in the second file 112-3 of the database 110-3 is associated with a geopolitical region or an international region and at least one associated type of satellite.

The second file 112-3 is a binary file that contains a list of 8-bit values specifying the geopolitical region or international region at each complex polygon or grid point.

As shown in FIG. 5B, the grid point GP-262 is located at a geographical location in north-western Europe. The grid point GP-251 is located at a geographical location in the north-west section of Africa. The complex polygon CP-42 overlaps the southern Atlantic Ocean. In the exemplary database 110-3, the satellite type Galileo is associated with grid point GP-262 (third row of second file 112-3) and the satellite type GPS is associated with complex polygon CP-42 (first row of second file 112-3).

The MCS database 110 allows the GNS receiver to dynamically and automatically determine which constellation(s) of satellites are allowed for use depending on the airspace that it is currently in, and to automatically switch to using the appropriate satellites in real-time without any input from the pilot.

Russian KT-34-01 requirements are used for implementation of GLONASS. Latest revision to FAA AC20-138D limits GLONASS to advisory use only, specifically precluding operational credit for any operation including GLONASS. An internal memory map register (IMMR) implements GPS/GLONASS hybrid solution for positioning service only. When the aircraft in flying in an airspace that requires the use of GLONASS, the Airspace Multi-Constellation Select feature enables GLONASS. When the aircraft in flying in an airspace that rejects GLONASS (e.g. FAA-controlled), the Airspace Multi-Constellation Select feature disables GLONASS.

Figure 6:
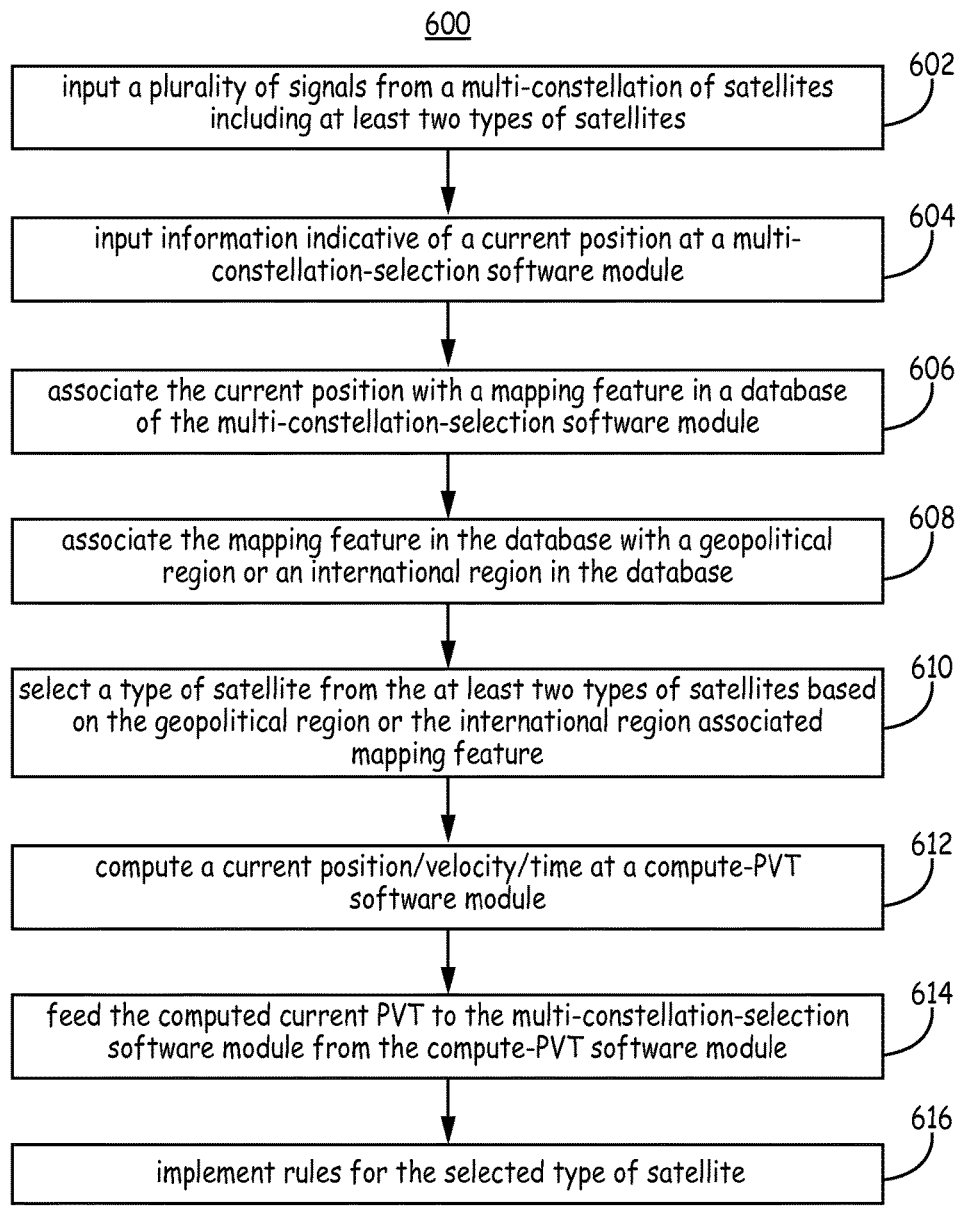
FIG. 6 is flow diagram of an embodiment of a method of selecting signals from a plurality of types of satellites in accordance with the present application.

FIG. 6 is flow diagram of an embodiment of a method 600 of selecting signals input from a plurality of types of satellites in accordance with the present application. Method 600 is described with reference to the MCS system 100 shown in FIGS. 2A-2C.

At block 602, a plurality of signals is input from a multi-constellation 50 of satellites including at least two types of satellites. At block 604, information indicative of a current position is input at a multi-constellation-selection software module 145.

At block 606, the current position is associated with a mapping feature in a database 110 of the multi-constellation-selection software module 145. At block 608, the mapping feature in the database 110 is associated with a geopolitical region or an international region in the database 110. At block 610, at least one type of satellite is selected from the at least two types of satellites based on the geopolitical region or the international region associated with the mapping feature.

At block 612, a current position/velocity/time is computed at a compute-position/velocity/time (PVT) software module 150. The compute-position/velocity/time (PVT) software module 150 implements the rules for the at least one selected type of satellite in computing the position/velocity/time. Specifically, the compute-PVT software module 150 uses the rules associated with the geopolitical region to generate navigation data including the position, velocity, and time to the processor 130 and to the multi-constellation-selection software module 145.

At block 614, the computed current position/velocity/time (and any other navigation data required for the geopolitical region) is fed to the multi-constellation-selection software module 145 from the compute-PVT software module 150.

At block 616, the rules for the selected type of satellite are implemented. The computed current position/velocity/time is output to a processor 130 from the compute-PVT software module 150. The processor 130 generates a navigation signal to be output the rest of the navigation system as known to one skilled in the art.

As the vehicle 10 moves or as the satellites in communication with the vehicle 100 shift, the type of satellite (or types of satellite) can be reselected. For example, if the mapping feature in the database associated with the geopolitical region or the international region is a first mapping feature associated with a first geopolitical region or a first international region and the vehicle 10 moves so that it is no longer associated with the first mapping feature then the computed current position/velocity/time fed to the multi-constellation-selection software module is associated with a new second mapping feature. If the second mapping feature is associated with a second geopolitical region or a second international region that requires implementation of a different type of satellite, then another type of satellite is reselected from the at least two types of satellites based on the computed current position/velocity/time being associated with the second geopolitical region or the second international region.

Figure 7:
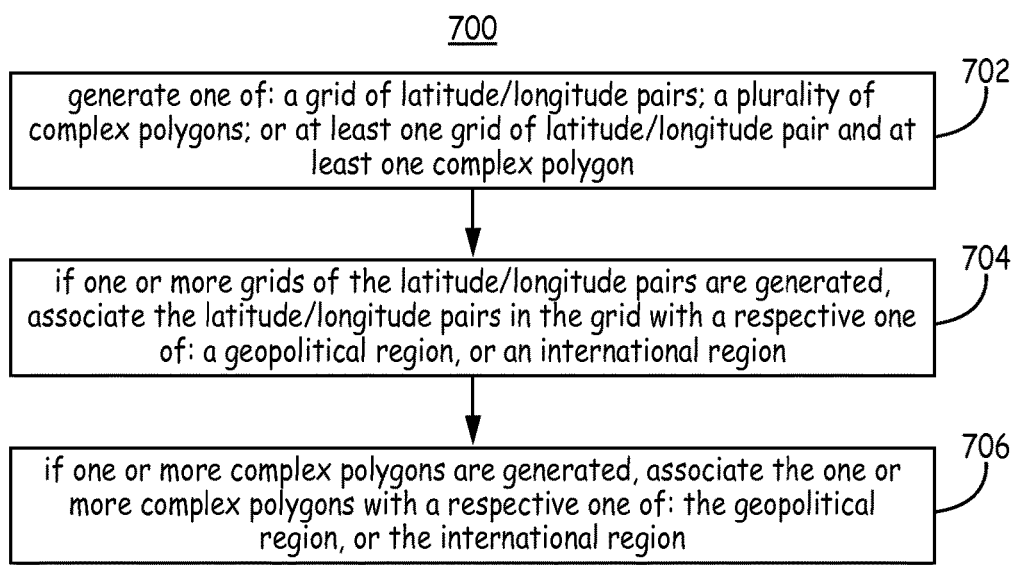
FIG. 7 is flow diagram of an embodiment of a method of generating and implementing a database to select a type of satellite from a multi-constellation of satellites for use in a navigation system in accordance with the present application.

FIG. 7 is flow diagram of an embodiment of a method 700 of generating and implementing a database to select a type of satellite from a multi-constellation 50 of satellites 60(1-N), 61(1-N), and 62(1-N) for use in a navigation system 100 in accordance with the present application. Method 700 is described with reference to the navigation system 100 shown in FIGS. 2A-2C.

At block 702 one of: a grid of latitude/longitude pairs; a plurality of complex polygons; or at least one grid of latitude/longitude pair and at least one complex polygon is generated. Exemplary grids and complex polygons are shown in FIGS. 2B, 4B, and 5B.

At block 704, if one or more grids of the latitude/longitude pairs are generated, the latitude/longitude pairs in the grid are associated with a respective one of a geopolitical region or an international region. At block 706, if one or more complex polygons are generated, the one or more complex polygons are associated with a respective one of the geopolitical region or the international region.

In one implementation of this embodiment, a grid of latitude/longitude pairs is generated to span the earth. In another implementation of this embodiment, the grid of latitude/longitude pairs is generated by: 1) latitudinally incrementing through a plurality of latitudes from a first grid point by a respective plurality of latitude units; 2) obtaining a respective plurality of the latitude/longitude pairs from the latitudinal incrementing; 3) longitudinally incrementing through a plurality of longitudes from a second grid point by a respective plurality of longitude units; and 4) obtaining a respective plurality of the latitude/longitude pairs from the longitudinal incrementing.

In one implementation of this embodiment, a plurality of complex polygons are generated to span the earth. In yet another implementation of this embodiment, one (or more) complex polygons associated with a respective one (or more) border are generated. In this case, the one (or more) border is associated with a respective one (or more) geopolitical region or a respective one (or more) international region. In yet another implementation of this embodiment, the generated plurality of complex polygons are associated with a respective plurality of borders. In this case, the plurality of borders are associated with a respective one of a geopolitical region, and an international region. In yet another implementation of this embodiment, a plurality of grids associated with a respective one (or more) geopolitical region having a respective one (or more) geopolitical border are generated and a plurality of complex polygons associated with a respective plurality of international regions are generated. In this case, the grids and complex polygons span the earth.

An exemplary case of generating a grid is now described in detail. A computer or processor is used to generate this grid, which is then downloaded into the database 110. A first grid point is defined to be at S90 degrees, E0 degrees. Step north along the Prime Meridian by $s_{lat}$, where $s_{lat}$ is the value of the latitude step. The value of $s_{lat}$ is provided in the file to be downloaded to MCS database 110. For this latitude, obtain the longitude step $s_{lon}$ using the equation:

$$s_{lon}(\text{latitude}) = \frac{360}{\left\lfloor \min\left(360, \frac{s_{lat}}{\cos(\text{latitude})}\right) \right\rfloor}$$

Then, starting at the Prime Meridian, define a point at each step of $s_{lon}$ units east along a line of latitude (parallel to the Equator) until the Prime Meridian is reached again. Repeat these steps until reaching the latitude [90 degrees-$s_{lat}$]. Include this latitude in the database. The final point is defined to lie at N90 degrees, E0 degrees.

The GNS receiver uses the geopolitical region associated with the MCS database grid point closest to the GNS receiver's current position to determine the allowed GNSS constellations for the current position. The GNS receiver uses (acquires, tracks, and makes measurements from) GNSS satellites from GNSS constellations that are allowed for the current position. The GNS receiver uses the geopolitical region associated with the MCS database grid point closest to the GNS receiver's current position to determine the allowed SBAS providers for the current position. In the event that the GNS receiver is equally close to two (or more) grid points, either grid point can be used. The GNS receiver uses (acquires, tracks, makes measurements, and use augmentation data from) SBAS satellites from SBAS providers that are allowed for the current position.

In one implementation of this embodiment, the GNS receiver is capable of storing an MCS database having a step latitude ($S_{lat}$) of $\frac{1}{40}$th degree or larger. The step latitude affects the size of the database file.

EXAMPLE EMBODIMENTS

Example 1 includes a system to select one or more types of satellites from a plurality of types of satellites in a multi-constellation of satellites, the system comprising: a plurality of receivers including at least: a first receiver configured to input signals from a first type of satellite; and a second receiver configured to input signals from a second type of satellite; a processor configured to: execute a multi-constellation-selection software module to: associate a current position with a mapping feature; select at least one selected type of satellite from the plurality of types of satellites based on the associated mapping feature; and execute a compute-position/velocity/time (PVT) software module in order to compute a current position/velocity/time based on at least one selected input signal input at a receiver associated with the at least one selected type of satellite; and feed the computed current position/velocity/time to the multi-constellation-selection software module based on the execution of the compute-PVT software module to implement rules for the at least one selected type of satellite.

Example 2 includes the system of Example 1, wherein the first type of satellite is selected from a type of satellite in a currently available Global Navigation System Satellite (GNSS), wherein the second type of satellite is selected from a type of satellite in the currently available Global Navigation System Satellite (GNSS), wherein the first type of satellite is different from the second type of satellite.

Example 3 includes the system of any of Examples 1-2, wherein the first type of satellite is different from the second type of satellite.

Example 4 includes the system of any of Examples 1-3, wherein the first type of satellite is different from the second type of satellite, and wherein at least one of the first and the second type of satellite is an SBAS satellite.

Example 5 includes the system of any of Examples 1-4, wherein the multi-constellation-selection software module includes a database including information including: the multi constellation selection database part number; a list of currently active Global Navigation System Satellite constellations; a list of currently active Satellite-Based Augmentation System providers; and a list of geopolitical regions.

Example 6 includes the system of Example 5, wherein the list of geopolitical regions further includes: allowed Global Navigation System Satellite constellations for the geopolitical regions; and Satellite-Based Augmentation System providers for the geopolitical regions.

Example 7 includes the system of any of Examples 5-6, wherein the database further includes the mapping features including: a plurality of complex polygons that span the earth.

Example 8 includes the system of any of Examples 5-7, wherein the database further includes the mapping features including: a plurality of latitude/longitude pairs that span the earth in a grid.

Example 9 includes the system of any of Examples 5-8, wherein the database further includes the mapping features including: at least one complex polygon; and a plurality of latitude/longitude pairs that span at least one portion of the earth in a grid.

Example 10 includes the system of any of Examples 1-9, further comprising: at least one antenna communicatively coupled via communication links to at least one first type of satellite and at least one second type of satellite.

Example 11 includes a method of selecting signals input from a plurality of types of satellites, the method comprising: inputting a plurality of signals from a multi-constellation of satellites including at least two types of satellites; inputting information indicative of a current position at a multi-constellation-selection software module; associating the current position with a mapping feature in a database of the multi-constellation-selection software module; selecting at least one type of satellite from the at least two types of satellites based on the associated mapping feature; and computing a current position/velocity/time at a compute-position/velocity/time (PVT) software module to implement the rules for the at least one selected type of satellite.

Example 12 includes the method of Example 11, further comprising: associating the mapping feature in the database with a geopolitical region or an international region in the database, and wherein selecting the at least one type of satellite from the at least two types of satellites comprises: selecting the at least one type of satellite based on the geopolitical region or the international region associated with the mapping feature, the method further comprising: feeding the computed current position/velocity/time to the multi-constellation-selection software module from the compute-PVT software module.

Example 13 includes the method of Example 12, wherein the mapping feature in the database associated with the geopolitical region or the international region is a first mapping feature associated with a first geopolitical region or a first international region, wherein the computed current position/velocity/time fed to the multi-constellation-selection software module is associated with a second mapping feature that is associated with a second geopolitical region or a second international region, and wherein selecting the at least one type of satellite from the at least two types of satellites comprises: reselecting another type of satellite from the at least two types of satellites based on the computed current position/velocity/time being associated with the second geopolitical region or the second international region.

Example 14 includes the method of any of Examples 11-13, further comprising: outputting the computed current position/velocity/time to a processor from the compute-PVT software module.

Example 15 includes a method of generating a database to select at least one type of satellite from a multi-constellation of satellites for use in a navigation system, the method comprising: generating one of: a grid of latitude/longitude pairs; a plurality of complex polygons; or at least one grid of latitude/longitude pair and at least one complex polygon; if one or more grids of the latitude/longitude pairs are generated, associating the latitude/longitude pairs in the grid with a respective one of: a geopolitical region, or an international region; and if one or more complex polygons are generated, associating the one or more complex polygons with a respective one of: the geopolitical region, or the international region.

Example 16 includes the method of Example 15, wherein generating the grid of latitude/longitude pairs comprises: generating the grid so the latitude/longitude pairs span the earth.

Example 17 includes the method of any of Examples 15-16, wherein the generating one of: the grid of latitude/longitude pairs; the plurality of complex polygons; or the at least one grid of latitude/longitude pair and the at least one complex polygon comprises: generating one or more complex polygon associated with a respective one or more border, wherein the one or more border is associated with a respective one or more geopolitical region or a respective one or more international region.

Example 18 includes the method of Example 17, wherein the generating one or more complex polygon associated with the respective one or more border, comprises: generating a plurality of complex polygons associated with a respective plurality of borders, wherein the plurality of borders are associated with a respective one of a geopolitical region, and an international region, and wherein the plurality of complex polygons that span the earth.

Example 19 includes the method of any of Examples 17-18, herein the generating one of: the grid of latitude/longitude pairs; the plurality of complex polygons; or the at least one grid of latitude/longitude pair and the at least one complex polygon further comprises: generating one or more grid associated with a respective one or more geopolitical region, the one or more geopolitical region having a respective one or more geopolitical border.

Example 20 includes the method of any of Examples 17-19, wherein generating one of: the grid of latitude/longitude pairs; the plurality of complex polygons; or the one or more grid of latitude/longitude pair and the one or more complex polygon further comprises: generating a plurality of grids associated with a respective plurality of geopolitical regions, the plurality of geopolitical regions having a respective plurality of geopolitical borders.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to select one or more types of satellites from a plurality of types of satellites in a multi-constellation of satellites, the system comprising:
   a plurality of receivers including at least:
      a first receiver configured to input signals from a first type of satellite; and
      a second receiver configured to input signals from a second type of satellite;
   a processor configured to:
      execute a multi-constellation-selection software module to:
         associate a current position with a mapping feature, wherein mapping features include at least one of:
            a plurality of grid points (GP);
            a plurality of complex polygons (CP); and a plurality of combinations of complex polygons and grid points;
         select at least one selected type of satellite from the plurality of types of satellites based on the associated mapping feature; and
      execute a compute-position/velocity/time (PVT) software module in order to compute a current position/velocity/time based on at least one selected input signal input at a receiver associated with the at least one selected type of satellite; and
      feed the computed current position/velocity/time to the multi-constellation-selection software module based on the execution of the compute-PVT software module, wherein the system is configured to implement rules of operation for the at least one selected type of satellite.

2. The system of claim 1, wherein the first type of satellite is selected from a type of satellite in a currently available Global Navigation System Satellite (GNSS), wherein the second type of satellite is selected from a type of satellite in the currently available Global Navigation System Satellite (GNSS), wherein the first type of satellite is different from the second type of satellite.

3. The system of claim 1, wherein the first type of satellite is different from the second type of satellite.

4. The system of claim 1, wherein the first type of satellite is different from the second type of satellite, and wherein at least one of the first and the second type of satellite is an SBAS satellite.

5. The system of claim 1, wherein the multi-constellation-selection software module includes a database including information including:
   the multi constellation selection database part number;
   a list of currently active Global Navigation System Satellite constellations;
   a list of currently active Satellite-Based Augmentation System providers; and
   a list of geopolitical regions.

6. The system of claim 5, wherein the list of geopolitical regions further includes:
   allowed Global Navigation System Satellite constellations for the geopolitical regions; and
   Satellite-Based Augmentation System providers for the geopolitical regions.

7. The system of claim 5, wherein
   the plurality of complex polygons are arranged in a non-overlapping pattern that segment and span the earth.

8. The system of claim 5, wherein
   the plurality of grid points comprise a plurality of latitude/longitude pairs that span the earth in a grid.

9. The system of claim 5, wherein the plurality of combinations of complex polygons and grid points include:
   at least one complex polygon; and
   a plurality of latitude/longitude pairs that span at least one portion of the earth in a grid.

10. The system of claim 1, further comprising:
    at least one antenna communicatively coupled via communication links to at least one first type of satellite and at least one second type of satellite.

* * * * *